T. W. WILLIAMS.
Securing Nuts on Axles.
No. 17,410. Patented May 26, 1857.
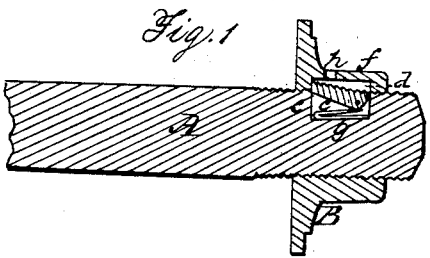
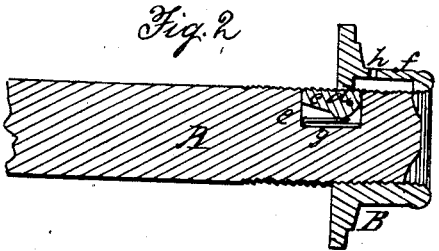
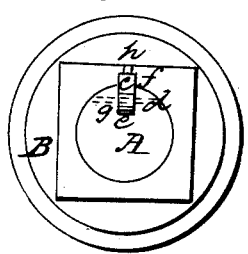
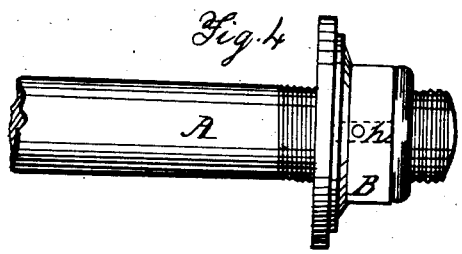
Witnesses.
Inventor:

UNITED STATES PATENT OFFICE.

THOS. W. WILLIAMS, OF PHILADELPHIA, PENNSYLVANIA, ASSIGNOR TO HIMSELF AND HENRY T. HOYT.

SECURING NUTS ON AXLES.

Specification of Letters Patent No. 17,410, dated May 26, 1857.

*To all whom it may concern:*

Be it known that I, THOMAS W. WILLIAMS, of the city of Philadelphia, in the State of Pennsylvania, have invented a new and useful Improvement in the Mode of Securing Screw-Nuts Upon Axles; and I do hereby declare that the following is a full, clear, and exact description of the construction and operation of the same, reference being had to the accompanying drawings, making a part of this specification, in which—

Figure 4, represents one end of a common carriage-axle and nut, with the improvement applied; Figs. 1, and 2, vertical longitudinal sections of the same; and Fig. 3, a transverse section through the nut, like letters in the different figures indicating the same objects.

My invention has for its object the more perfect security of a screw-nut, upon an axle of any kind, against being unscrewed by jarring, vibrating, or rotating the wheel or axle; while at the same time the nut is free from any projections thereof and can readily be unscrewed by hand as occasion may require.

It consists in placing a small lever-key and spring within a mortise or recess made in either the axle or nut, so that as the nut is being screwed up to its proper position on the axle, the said lever-key is caused thereby to yield or sink within the said mortise; and when the nut has been advanced to its proper position upon the axle as described, the said lever-key from the pressure of the spring beneath, rises and sufficiently enters a corresponding mortise in the opposite piece and thus prevents the possibility of the nut being further rotated in either direction.

Referring to the drawings, A, is the axle; B, the nut; *c* the lever-key; *d*, the pin upon which it turns; *e* the mortise or recess in the axle; *f*, the corresponding mortise or recess in the nut; *g*, the spring which causes the lever (*c*) to project beyond its retaining mortise; and *h*, a small hole through which the said lever (*c*) can be readily depressed when the nut is required to be unscrewed or rotated.

The mortise (*e*) in the axle is made in a longitudinal direction, and that in the nut, to correspond therewith so that when the nut is screwed up to its place, as shown in Fig. 1, the lever (*c*) turning upon the small pin (*d*) and being forced outwardly by the pressure of the spring (*g*) partly enters the opposite mortise or recess and thus effectually stops the rotary motion of the nut (B) on the same principle as the well known sliding key-wedge fixes a wheel upon a shaft. When the nut is required to be unscrewed, the raised end of the said lever-key (*c*) is pressed into its retaining mortise or recess, by means of any small iron pin, or common nail, applied through the hole (*h*); the said pin when so inserted, serving also the purpose of a wrench or hand lever in rotating the nut. This mode of securing the nuts upon axles, especially those of carriages, possesses several peculiar advantages, and among which may be mentioned the facts that the whole fastening being covered by the nut, dust and dirt is effectually precluded; and there being no projecting parts thereof, there is no liability to breakage from external causes; while from the fact that the lever (*c*) acts like the well known shaft-and-wheel key in preventing rotary motion of the one upon the other, it is especially efficient, neat and durable for the purpose.

What I claim as my invention and desire to secure by Letters Patent of the United States, is—

Securing nuts upon axles by means of the lever-key (*c*) and the mortises or recesses (*e* and *f*); the same being constructed and arranged so as to operate together in combination substantially in the manner set forth and described.

THOS. W. WILLIAMS.

Witnesses:
 BEN. MORISON,
 JNO. B. KENNEY.